INVENTOR
LÉON BERMAN
BY Craig and Freudenberg
ATTORNEYS

INVENTOR: LEON BERMAN
BY: Paul M. Craig, Jr. ATTORNEY

INVENTOR
LEON BERMAN
BY: Paul M. Craig, Jr.
ATTORNEY

| | |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | (1001) → 1111 (=15) |

INVENTOR
LEON BERMAN
BY: Paul M. Craig, Jr.
ATTORNEY

Nov. 3, 1964 L. BERMAN 3,155,908

ELECTRONIC CODING DEVICE FOR RADIOELECTRIC OR TELEPHONE LINKS

Filed June 16, 1961 6 Sheets-Sheet 5

INVENTOR
LÉON BERMAN
BY Craig and Freudenberg
ATTORNEYS

Nov. 3, 1964 L. BERMAN 3,155,908

ELECTRONIC CODING DEVICE FOR RADIOELECTRIC OR TELEPHONE LINKS

Filed June 16, 1961 6 Sheets-Sheet 6

INVENTOR
LÉON BERMAN
BY Craig and Freudenberg
ATTORNEYS

United States Patent Office 3,155,908

Patented Nov. 3, 1964

3,155,908

ELECTRONIC CODING DEVICE FOR RADIO-ELECTRIC OR TELEPHONE LINKS

Léon Berman, Asnieres, France, assignor to Compagnie Industrielle des Téléphones, Paris, France Filed June 16, 1961, Ser. No. 117,732
Claims priority, application France Oct. 28, 1960
10 Claims. (Cl. 325—35)

The present invention relates to a coding device for radio or telephone links with single-sideband and suppressed carrier, and more particularly relates to systems employing high-stability frequencies for which no manuel adjustment is necessary.

In accordance with the invention the coding is obtained by cyclic switching of the carrier frequency, to which is given, in the course of one cycle, which will hereinafter be called "coding cycle," a certain number of values spaced by a few hundred or thousand of cycles per second.

In the course of one cycle $n$ different values are successively given to the carrier frequency emitted, the differences between which values are multiples of a frequency difference chosen in such a way that the reception is incomprehensible if the carrier frequencies applied respectively to the transmitting station and to the receiving station have the said difference between them.

The message can only then be decoded if the carrier frequency applied to the receiving station varies in accordance with the same cyclic law as the carrier frequency employed at the transmitting station.

The number of different cycles is obviously equal to the number of ways of arranging $n$ different elements in $n$ places, these $n$ elements representing different values which are given to the carrier frequency; this number is equal to the permutation number $n!$ If we take $n=10$, we obtain 3,628,800 different combinations and for $n=16$ we obtain more than $2.10^{13}$.

A receiving station, comprising a decoding apparatus identical with that of the transmitting station, but unaware of the code employed, would therefore have to hunt through 3,628,800, or among more than $2.10^{13}$, combinations in order to decode the message.

The first case already gives a sufficient guarantee of secrecy, but the invention provides means of still further increasing it.

In fact, it is possible to employ at each station a number $m$ of oscillators higher than the number $n$ of the values of frequencies supplied during one coding cycle, which multiplies the number of possible combinations by the factor $$C_{m}^{n}=\frac{m'}{n!(m-n)!}$$

this number of combinations then becomes equal to the number of arrangements $A_m^n$ of $m$ objects $n$ to $n$; for example for $n=10$ and $m=16$ it is equal to $A_{16}^{10}=$ 29,059,430,400.

It is also possible to change the duration of the coding cycle which, for a given choice of carrier frequencies, multiplies the number of possible different cycles by the number of the different durations which may be given to the cycle.

In its most general form the coding device in accordance with the invention has the following characteristics:

(1) It comprises, at the transmitting station, in order to determine the period of the coding cycle, an oscillator supplying a voltage of frequency N kc./s. followed by a frequency divider of ratio $k$ providing in its output a series of short pulses which will hereinafter be called "starting pulses," lasting not more than 10 milliseconds, and having a period of recurrence of $k/N$ milliseconds.

(2) This series of pulses is applied, at the same time as the signal-modulating frequency, to the transmission modulator, so that it is transmitted for synchronisation to the receiving station, where a member is arranged to select it.

(3) The period of the coding or decoding cycle is obtained by application of the series of pulses locally generated at the transmitting station, or selected at the receiving station, to a bistable flip-flop or multi-vibrator circuit which is brought into the operating position by the reception of the starting pulse every $k/N$ milliseconds, and is restored to normal for a very short time before this pulse. In the operating position the bistable flip-flop or multi-vibrator circuit determines the opening of a gate receiving, on the other hand, the oscillations generated by an oscillator at a frequency of N' kilocycles per second. The output of this gate is connected to a frequency divider of ratio of $k'$, which provides in its output short pulses of a duration not exceeding 10 milliseconds with a period of recurrence of $k'/N'$ milliseconds.

(4) These pulses, with a recurrence period of $k'/N'$ milliseconds, are applied to a counter comprising S binary flip-flop or multi-vibrator circuits of which the $2^S$ outputs are connected to $2^S$ inputs of a decoding matrix of which the $2^S$ outputs each pass through a singular condition during the time of the appearance or application of a number on the counter (from 0 to $2^S-1$). These $2^S$ outputs of the matrix are multiplied on the contacts of $2^S$ manual switches of which the slides or wipers are each connected to a different gate of an assembly of $2^S$ gates each associated with an oscillator, said gates being opened for the singular condition of said outputs and the outputs of said gates, connected in paralled, being connected to one of the inputs of a frequency mixer, so that each oscillator is connected to said input for the duration of the opening of the gate, determined by the position of the associated slide or wiper.

(5) The return of the counter to zero, that of the frequency divider and the return to normal of the bistable flip-flop or multi-vibrator circuit, are determined by the pulse of order $2^S$ received by the counter, at a time later by $2^S k'/N'$ milliseconds than the preceding starting pulse, the values of $k$, N, $k'$, N', and S being so chosen that $2^S k'/N'$ is less than $k/N$ by a quantity of the order of 10, so that a difference of the order of 10 milliseconds separates the return to zero of the flip-flop from the next starting pulse.

The device according to the invention may comprise known means for transforming a counter with 4 binary flip-flop or multi-vibrator circuits into a decimal counter in such a way as to employ, for 10 elementary intervals of the coding cycle, the frequency of 10 different oscillators.

Moreover, the device may comprise a larger number of oscillators than the number of different frequencies of a coding cycle, which makes it possible to obtain coding cycles which differ by the frequencies employed.

Accordingly, it is an object of the present invention to provide a coding system, particularly for radio or telephone links with single-side band and suppressed carrier which is relatively simple in construction, yet permits a large number of coding combinations thereby assuring complete secrecy.

Another object of the present invention resides in the provision of a coding device, particularly for radio or telephone links operable with single-side band and suppressed carrier in which the cyclic coding is so selected that reception is completely rendered incomprehensible unless the cyclically buried carrier frequencies applied respectively to the transmitting and receiving station have the same frequency differences therebetween.

Another object of the present invention resides in the provision of a secrecy code system which assures complete privacy and less likelihood of breaking the code.

A further object of the present invention resides in the provision of a coding device, particularly for radio or telephone links with single side band and suppressed carrier in which no manual adjustment is necessary for the high stability frequencies utilized therein, yet reduces the danger of incorrect operation as a result of errors in the synchronization between transmitter and receiver stations.

We shall now describe the device in accordance with the invention with reference to the attached figures, which apply, by way of non-limitative example, to a system in which 10 different values are given to the carrier frequency.

FIG. 1 gives an example of a diagram of the transmitting station.

FIG. 1*a* is a schematic wiring diagram of a complete receiver-transmitter station provided with a coding and decoding device in accordance with the present invention.

FIG. 1*b* is a schematic showing of the interrelationship between the starting pulses G and the synchronization pulses S used in the system according to the present invention.

FIG. 2 represents the electronic switch ensuring the cyclic switching of the carrier frequencies, in association with manual switches.

FIG. 2*a* is a schematic diagram of a decimal counter circuit used in the system of the present invention.

Figure 1:
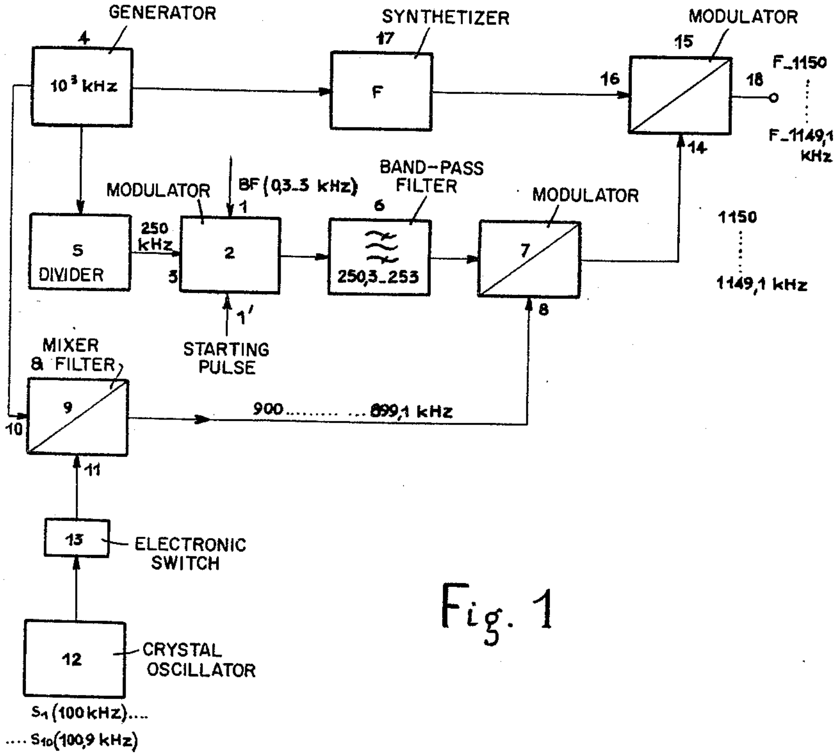

The low frequency signal to be transmitted is applied at 1 (FIG. 1) to a modulator 2, to the terminal 3 of which is applied a frequency supplied by a generator 4 of 1000 kc./s. followed by a divider 5 of ratio 4, consequently giving a frequency of 250 kc./s.

The modulator 2 also receives at 1' the starting pulses serving for the synchronisation. The manner in which the starting pulses are obtained will be described more fully hereinafter.

The modulator 2 is connected to a band-pass filter 6 of conventional construction selecting the first upper side-band, that is to say, if the low frequency occupies the band from 300 to 3000 c./s. a band of 250.3 to 253 kc./s.

This filter 6 is followed by a second modulator 7 which receives at 8 a frequency with cyclic variation obtained in a manner to be described more fully hereinafter.

This frequency is obtained in the output of a mixer 9, to the inputs 10 and 11 of which are respectively applied a frequency of 1000 kc./s. and one of the 10 coding frequencies 100, 100.1 . . . 100.9 kc./s., produced by a group 12 of crystal oscillators $S_1, S_2 \ldots S_{10}$ and selected by an electronic switch 13 which will be described later.

The output frequency of the mixer 9 results from the difference between the frequency 1000 kHz., derived from the oscillator 4 at the input 10, and from one of the ten frequencies 100, 100.1, 100.2 . . . 100.9 kHz., arriving at the input 11. This output frequency therefore has one of the following values:

900, 899.9, 899.8 . . . 899.1 kHz.

The output frequency is applied to the input 8 of the mixer 7 which itself is fed, on the other, by the frequency 250 kHz., modulated and derived from the modulator 2 after passage through the filter 6. The mixer or modulator 7 therefore supplies one of the frequencies 1150, 1149.9, 1149.8 . . . 1149.1 kHz. (modulated). This frequency is applied to the modulator or mixer 15 where it is combined with the frequency F, arriving at the input 16, to furnish one of the frequencies F–1150 . . . F–1149.1 kHz. (modulated).

This frequency is applied at 14 to a third modulator 15 which, moreover, is fed at 16 by a frequency F supplied by a member 17 known as a synthetiser, which, starting from a frequency of 1000 kc./s. gives a frequency which can be adjusted kilocycle by kilocycle. A synthetiser of this kind has been described in French Patent 1,180,065 filed on July 2, 1957 or in the "Proceedings of the I.R.E." of December 1956, page 1680, in an article by P. Fisk and C. L. Spencer, and entitled "Synthetizer Stabilized Single-Band Systems."

In the output 18 of the third modulator 15 we therefore obtain carrier frequencies equal to F–1150, F–1149.9 . . . F–1149.1 kc./s.

A description will now be given with reference to FIGURE 2 of the electronic commutating device 13 for switching the carrier frequencies arranged at each of the two transmitting and receiving stations.

The electronic commutating device 13 includes a bistable multi-vibrator 19 of which the operation will be first described at the transmitting station.

The input 20 of this flip-flop or multi-vibrator circuit 19 is connected to a switch K, of which the contact E (transmission) is connected to the output of a frequency divider 22 of ratio 1000, of which the input is fed by an oscillator 21 supplying a frequency of 990 c./s., so that this divider supplies short pulses of duration not longer than 100 milliseconds and spaced by 1.01 seconds. The contact E of the switch K, on the other hand, is connected to an input terminal 1' of the transmission modulator 2, so that the above-mentioned pulses are transmitted to the transmitting station in the same way as the modulating signals.

The "normal" or "rest" position of the bistable flip-flop or multi-vibrator circuit 19 is that for which the multi-vibrator circuit furnishes the logical value "zero," that is for which the multi-vibrator circuit does not transmit any current to the gate 24 in such a manner that the gate 24 is closed. In contradistinction thereto, in the "working" position, the multi-vibrator circuit 19 is in the logical condition "one," and transmits a current to the gate 24 which in turn opens the gate 24.

If the bistable flip-flop or multi-vibrator circuit 19 is restored to the "normal" position immediately before the reception of a pulse, it passes over into the operating position upon the reception of this pulse, which causes the opening of a gate 24 connected to the output 23 of the flip-flop or multi-vibrator 19. A second input of this gate is connected to the generator 25 supplying a frequency of 1000 c./s. A divider 26 of ratio 100 is connected to the output of the gate 24 and supplies pulses of a duration of 0.01 second and a period of recurrence of 0.1 second to a counter 27 comprising 4 binary flip-flop or multi-vibrator circuits A, B, C, D.

Figure 2:
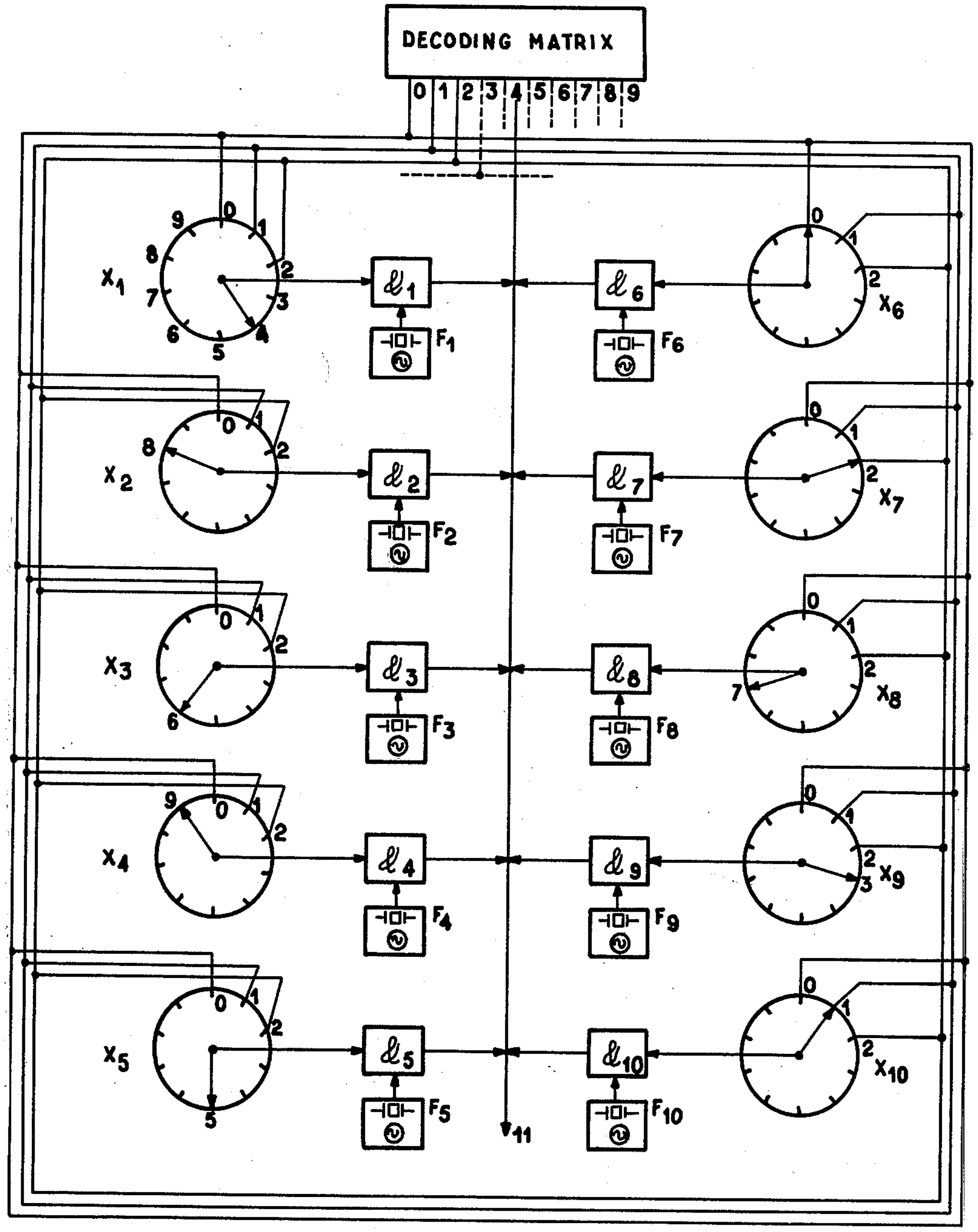
Figure 2A:
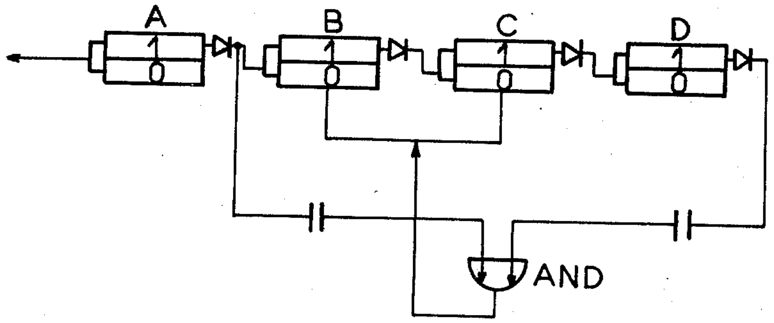

FIGURE 2*a* represents schematically such a decimal counter of which the principle of operation is well-known, as for example, described by R. K. Richards in "Arithmetic Operations in Digital Computers," D. Van Nostrand, New York, 1955, Chapter 6 entitled "decimal codes."

The four multi-vibrators display successively the decimal numbers from 0 to 8 of which the values in natural binary designation are indicated in this figure. When the pulse arrives corresponding to the decimal figure 9, of which the value in binary natural code is 1 0 0 1, the values 1 appearing at the first and last multi-vibrators A and B act on the "AND" coincidence circuit, and since the output of this circuit is connected with the two other multivibrators B and C, the output signal of "AND" produces the flip-flop of the said multi-vibrators B and C; the latter, which were in the state "zero," since 9=1 0 0 1, therefore pass over into the state "1." The four multi-vibrators therefore find themselves in the state or condition "1."

One may thus readily see that the number displayed at the counter passes thus directly from 1 0 0 0, corresponding to 8, to 1 1 1 1 which corresponds to the decimal number 15. The intermediate number 1 0 0 1, corresponding to the decimal number 9, remains displayed only in a transitory and fugitive manner. When the counter thereupon receives the 10th pulse, it passes from 1 1 1 1 to 0 0 0 0 by the interplay of the normal functions of a binary counter.

The first outputs of these flip-flop or multi-vibrator circuits first of all display or apply the digits A, B, C, D corresponding to the number of pulses DCBA expressed in binary code, up to the eighth pulse, and the second outputs the complementary digits $\overline{A}$, $\overline{B}$, $\overline{C}$, $\overline{D}$. In order to obtain the desired decimal counter, as is known, the direct passage is effected from digit 8 to digit 15, the passage to digit 9 (1 0 0 1), characterised by the display of 1 on the first and fourth flip-flop or multi-vibrator circuits and of the digit 0 on the second and third flip-flop or multi-vibrator circuits causing the change-over of the latter and the immediate substitution of the digit 15 (1 1 1 1) for the digit 9 (1 0 0 1).

The tenth pulse under these conditions restores the counter to zero one second after the starting pulse released by the flip-flop or multi-vibrator circuit 19. This tenth pulse also restores the divider 26 to zero and the flip-flop or multi-vibrator circuit 19 to normal. This is represented schematically in FIGURE 2 by a control wire starting from the terminal $\overline{D}$ (positive pulse corresponding to the tenth pulse, ensuring the operations indicated).

A hundredth of a second later the flip-flop or multi-vibrator circuit 19 again receives a starting pulse and the cycle is reproduced or repeated.

The 8 outputs of the 4 flip-flop or multi-vibrator circuits of the counter are connected to the inputs of a decoding matrix 28 comprising 16 outputs, only 10 of which are employed.

To each of the 10 conditions stored by the counter 27 corresponds the appearance of a singular condition on the corresponding output of the matrix 28; these outputs are multiplied on the contents of 10 manual switches $X_1 \ldots X_{10}$ of which the slides or wipers are respectively connected to 10 gates $P_1 \ldots P_{10}$ associated with 10 oscillators $S_1 \ldots S_{10}$, said gates $P_1 \ldots P_{10}$ being opened only when the corresponding output of the matrix 28 shows its singular condition; the operation of the slides or wipers therefore makes it possible to regulate the order of succession of the different frequencies of the input 11 of the mixer 9 (FIG. 1), the time of opening of the corresponding gates being determined by the position of said slides or wipers.

One embodiment of the gates associated with the oscillators, and of the decoding matrix 28 will be described more fully hereinafter.

In the "receive" position the switch K is placed on the contact R, connected to the member Y which selects the sync pulses transmitted by the transmitting station. The operation of the device is identical with that which has just been explained in the case of transmission, and the divider 26 transmits to the counter 27 pulses spaced by 0.1 second.

The oscillators 25 of nominal frequency 1000 c./s., respectively arranged at the transmitting station and the receiving station, can in fact provide frequencies having a slight difference between them so that the forward movements of the counters may not take place at the same speed in both stations; this is immaterial, since as will be seen the differences between the frequencies are only added for about one second.

Figure 3:
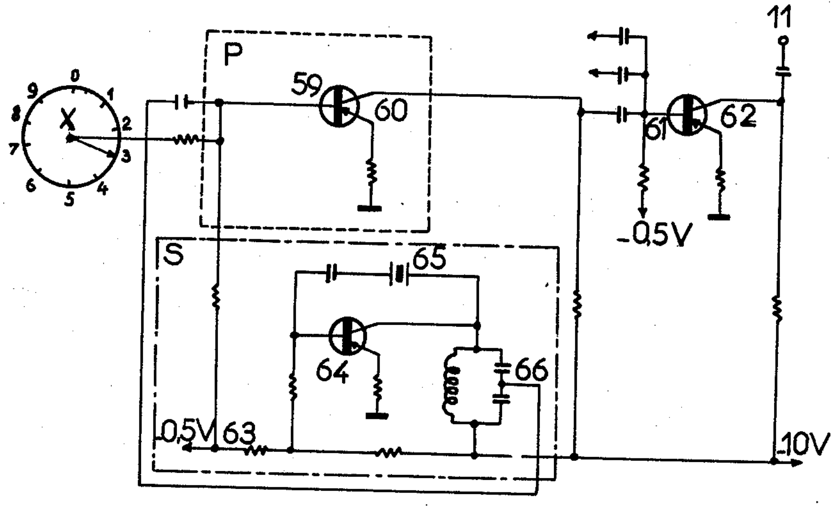
FIG. 3 shows the assembly of an oscillator and the gate associated therewith, and also the connection of this gate with the corresponding slide of the switch.

FIG. 3 represents by way of example one of the oscillators S and the gate P which is associated therewith.

The oscillator S is a transistorised oscillator 64, stabilized by a crystal 65 and of which the output 66 is connected via a capacitor to the base 59 of a transistor 60 which constitutes the gate P. The point 59 is connected by the slide or wiper of one of the 10 switches X to one of the ten outputs of the matrix 28 (FIG. 2) and also via a resistor to a point 63 of slightly negative potential (−0.5 volt) which tends to render the transistor conductive and to open the gate.

However, as will be seen further on, the outputs of the matrix 28 (FIG. 2) are connected to at least one terminal brought to a positive voltage when they are not in the singular condition, so that only said singular condition renders the transistor 60 conductive.

The outputs of the various gates P are connected via a capacitor to a common terminal 61 connected via a transistor 62 to the terminal 11 of the mixer 9 (FIG. 1).

In the position of the slide or wiper of the manual switch X, shown in FIG. 3, the oscillator S will be connected to the mixer 9 when the third pulse after the starting pulse is displayed on or appears at the counter 27 (FIG. 2).

Figure 4:
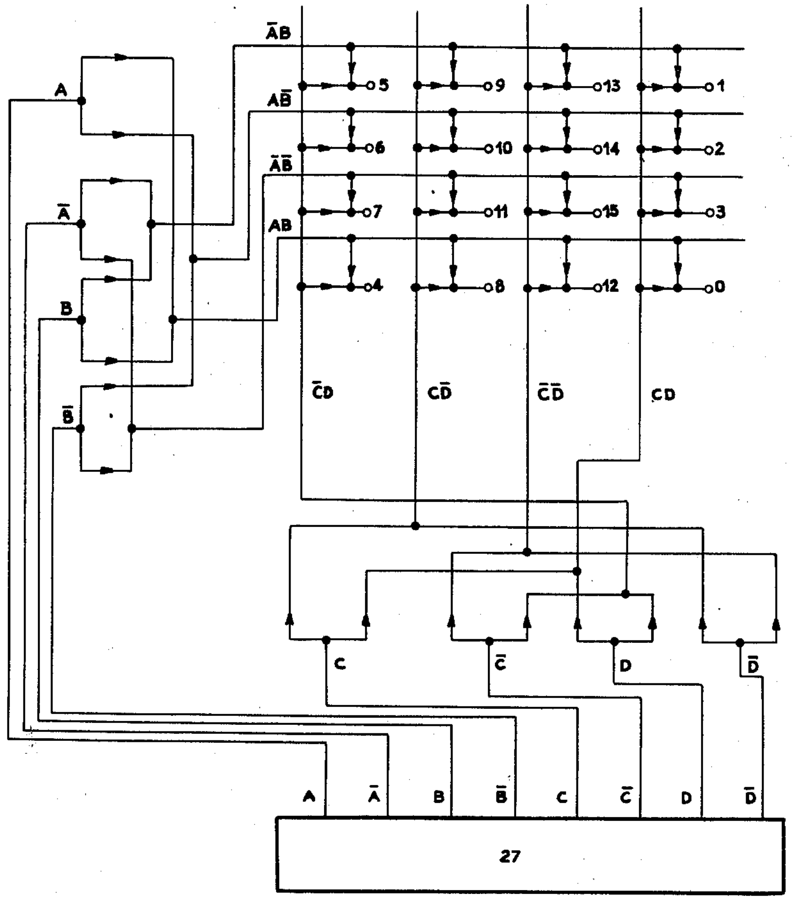
FIG. 4 shows in detail the diagram of a decoding matrix of the known type which may be associated with the counter.

FIG. 4 shows an embodiment of the decoding matrix 28 to the inputs of which are connected the outputs A, $\overline{A}$ . . . D, $\overline{D}$ of the counter 27. A positive voltage appears on said outputs for the digit 1 and a zero voltage for the digit 0.

The outputs 0, 1 . . . 15 of the matrix are connected by diode circuits respectively to 4 inputs A (or $\overline{A}$), B (or $\overline{B}$), C (or $\overline{C}$), D (or $\overline{D}$). For example the output 3 is connected to $\overline{A}$, $\overline{B}$, C, D and is isolated from any terminal having a positive voltage only in the position 3 of the counter 28 ($D=C=\overline{B}=\overline{A}=0$) which corresponds to the singular condition of the output.

It has been stated above that it was an advantage to be able to choose the carrier frequencies from those supplied by oscillators higher in number than that of the oscillators actually used during one coding cycle.

For this purpose it is sufficient to have a number of manual switches equal to that of the oscillators S to the gates P of which the slides or wipers are connected.

It is also possible to change the period of the coding cycle, which increases the difficulties of decoding. For this purpose it is sufficient, as shown in FIG. 2, to replace the dividers 26 and 22 of ratio 100 or 1000 (generally moreover composed of 2 or 3 dividers of ratio 10 connected in cascade), by groups of 2 or 3 dividers, 26*a*, 26*b*, and 22*a*, 22*b*, 22*c*, the dividers of indices *a*, *b*, *c*, dividing the frequency respectively by *p*, *q*, and 10.

It must be pointed out that the device according to the invention is not subject to errors capable of interfering with its good operation.

These causes of error may relate to the following points:

(1) Period of release of the bistable flip-flop or multi-vibrator circuit.

The flip-flop or multi-vibrator circuit receives a pulse of a duration in the vicinity of 0.01 second. The change of condition of the flip-flop or multi-vibrator circuit caused by the trailing edge of the pulse has a duration of the order of a fraction of a millisecond; this duration, moreover, is substantially the same at the transmitting and the receiving end, which gives an effect of compensation, so that it causes no lack of synchronism between the frequencies.

(2) Influence of the phase of the voltage produced by the 1000 c./s oscillator on the first pulse after the opening of the gate.

An error of one period is the possible limit. This period being a thousandth of a second, such an error is negligible in relation to the duration of application of the different carrier frequencies, which is of the order of the tenth of a second.

(3) Stability of the 1000 c./s. oscillator.

It can be admitted that the frequency of this oscillator is stable with a precision of the order of $10^{-3}$; during one second it is possible to register a difference of a thousandth of a second, which is negligible. Moreover there is no difficulty in producing an oscillator having a stability of $10^{-4}$ or more.

Figure 5:
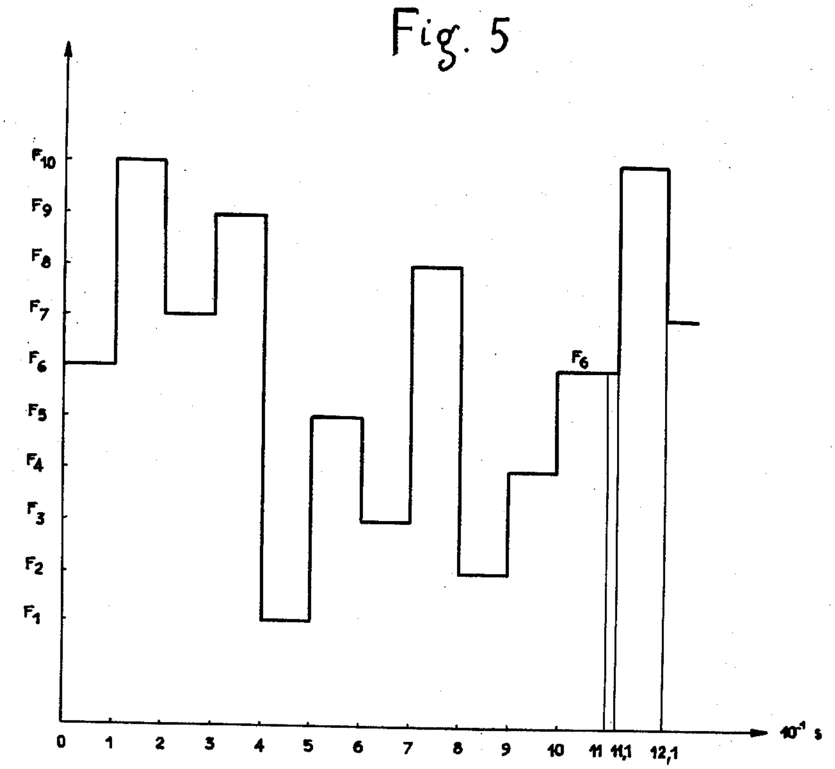
FIG. 5 is a diagram showing the sequence of the frequencies applied to the frequency mixer, for the position of the switches represented in FIG. 2.

FIG. 5 is a diagram showing the succession of the frequencies applied to the mixer when the slides or wipers of the manual switches are in the position shown in FIG. 2. We have taken as time origin the moment when a starting pulse opens the flip-flop or multi-vibrator circuit 19; the counter has been restored to zero and remains there for a period of 0.1 second, corresponding to the transmission on the mixer 9 of the frequency $$F_6=100.6$$

the slide or wiper of the sixth switch $X_6$ being in the position 0. This frequency $F_6$ is succeeded by the frequency $F_{10}=100.9$, the slide of $F_{10}$ being in position 1. In the time unit 0.9 second the frequency $F_4$ is sent, and in the time unit 1 a frequency $F_6$, a tenth pulse then restoring the counter to zero. It is only in the time unit 1.01 seconds that the flip-flop or multi-vibrator circuit 19 is opened, so that the frequency $F_6$ is applied during the interval of one second to 1.11 seconds.

*Operation*

The operation of the coding and decoding device will now be described with reference to FIGURES 1*a*, 1*b*, 2 and 5.

The oscillator 21 produces an oscillatory voltage of a frequency 990 kc./s. The output of the oscillator 21 is connected to the input of divider 22 dividing the oscillatory energy from oscillator 21 by a ratio of 1/1000 so that pulses are produced in the output of the divider 22 which are spaced approximately 1.010 seconds from each other and which will be referred to hereinafter as "starting pulses" G.

In the transmitter position of the switch K in which it engages the contact E, the starting pulses are applied to the bi-stable multi-vibrator 19. Since the useful output of the multi-vibrator 19 is initially zero, the arrival of one of the starting pulses G causes the multi-vibrator 19 to switch over to 1. The "and" gate 24 is thereby opened as soon as the multi-vibrator 19 is switched to 1 and enables thereby the application to the frequency divider 26 of the oscillations at 1 kc./s. supplied by the oscillator 25. As a result thereof, pulses appear at the output of the frequency divider 26 which effectively divides by 100, which constitute the synchronization pulses S spaced from each other by 100 milliseconds. The electronic counter 27, formed, for example, by 4 binary multi-vibrators A, B, C and D, provided with the necessary interrelations and interconnections to count from zero to 9, receives these synchronization pulses S. In the output of the decoding matrix 28, of any known conventional construction, there are provided ten output wires from zero to nine of which each carries a voltage, in the singular state thereof, depending on the order of the counted pulses. When the tenth pulse of the series (configuration of the counter: 15) arrives, the counter 27 as well as the multi-vibrator 19 are returned to zero, i.e., are reset in a conventional manner. The following starting pulse G again resets the multi-vibrator from zero to 1, and the operation repeats itself as described hereinabove.

Each of the ten commutators or switches $X_1$ to $X_{10}$ which form part of the electronic switch 13 (FIG. 1) presents 10 positions from 0 to 9. All of the 0 positions are multiplied on the output wire 0 of the decoding matrix 28, all of the positions 1 are multiplied on the output wire 1 of the decoding matrix 28, etc., up to and including position 9. The wiper of each commutator $X_1$ to $X_9$ applies the voltage which it collects along its course of movement to the "and" gate $T_1$, $P_2$ . . . $P_{10}$ which corresponds thereto.

It is only the one "and" gate circuit $P_i$ to which is applied at that moment the voltage corresponding to the singular state in the output of the decoding matrix which then permits passage toward the connection 11 of the frequency stabilized by a crystal from the corresponding oscillator $S_i$ which corresponds thereto, the totality of the ten oscillators $S_1$ through $S_{10}$ forming the oscillator assembly 12 of FIGURE 1.

As a result thereof, the modulator 2 receives at its input 1 the audio signal and at its input 1' the starting pulses G.

Figure 1B:
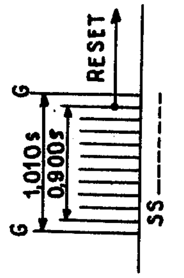
Figure 1A:
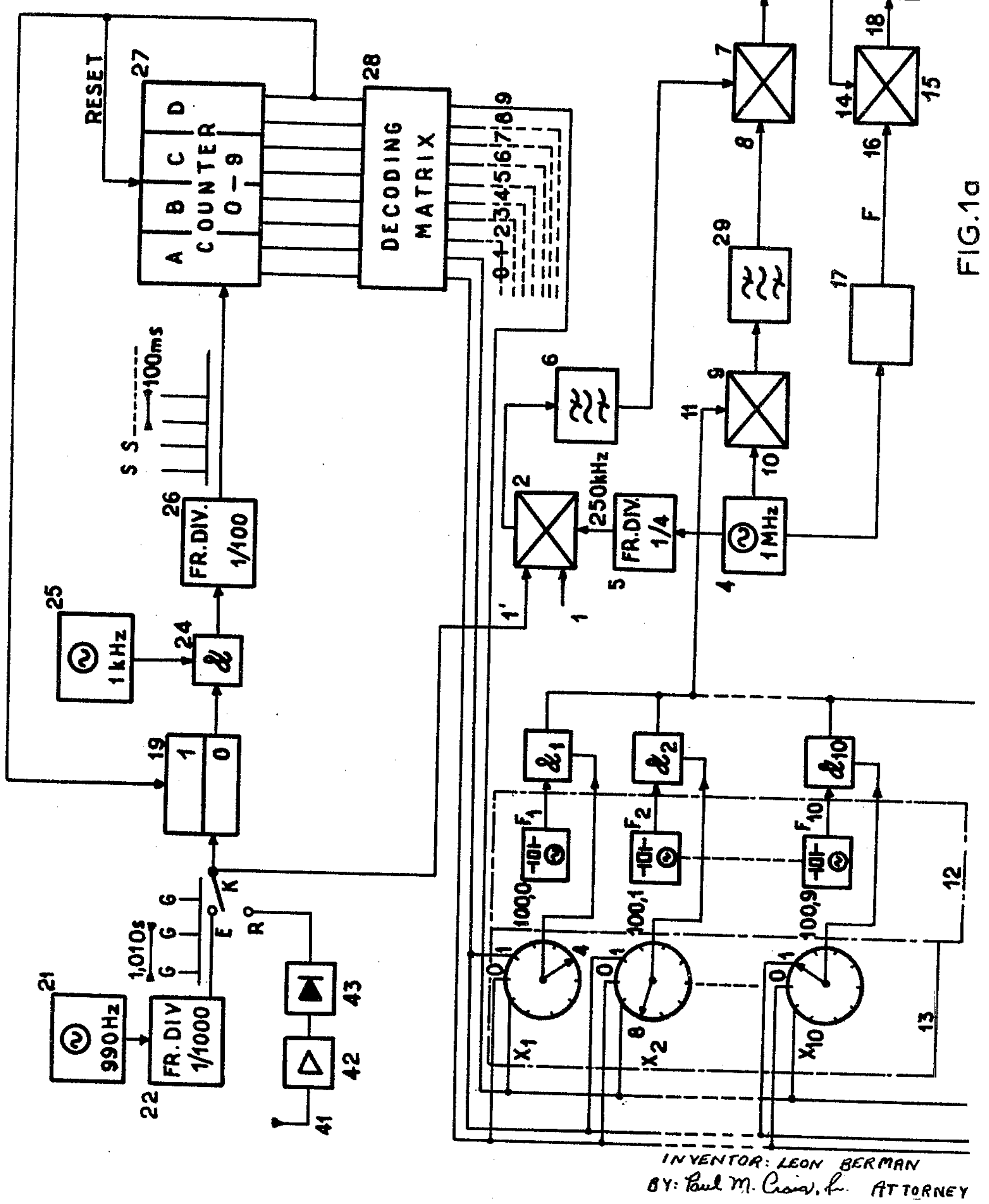

The modulators 2, 7, 9 and 15, associated respectively to the filters 6, 29, 30 and 31 produce the frequencies which are marked at the different places in FIGURE 1*a*.

Reference numeral 7 designates, as pointed out hereinabove, a frequency synthetizer of known type, a subassembly which, starting with the frequency of one megacycle per second, stabilized by the crystal control oscillator 4, produces, for example, between 2 and 25 megacycles, frequencies scaled from kilocycle to kilocycle, at the stability of the crystal, in accordance with the decimal index position. Since such a subassembly is currently well known in the art in connection with single side band systems, as mentioned hereinabove, a more full description thereof is dispensed with herein.

In the receiver position of the switch K when it engages with the contacts R, the electromagnetic waves received by a conventional receiver including an antenna 41 are amplified in the receiver 42, and the starting pulses G which have been added to the modulating signal in modulator 2 as described hereinabove, are separated and utilized also as described hereinabove.

Since the wipers of the commutators $X_1$ through $X_{10}$, forming the commutator subassembly 13 of FIGURE 1 are placed respectively in the same positions as the commutators of the same order of the transmitter, according to arrangements made beforehand, the demodulation takes place correctly in the receiver. However, for any other receiver which is not regulated in accordance with the code, the message received is incomprehensible.

FIGURE 1*b* illustrates the interrelationship between the starting pulses G and the synchronizing pulses S.

It is also noted that FIGURE 2 shows the position of the ten commutators $X_1$ through $X_{10}$ of the switch 13 to correspond to the succession of frequencies shown in FIGURE 5.

What is claimed is:

1. In a coding system for radio or telephone links operable with single side-band and with suppressed carrier, and employing a substantially synchronous cyclic switching of the carrier frequency at the transmitting and receiving stations, a coding device comprising:

means for determining the period of coding cycle including bistable multi-vibrator means provided with an input and an output and having a normal inoperative condition and an operating condition, pulse producing means for producing in the output thereof relatively short starting pulses with a period of recurrence $\tau$, first connecting means operatively connecting the output of said pulse producing means to the input of said multi-vibrator means to apply thereto said starting pulses and to change said multi-vibrator means from the said normal condition to the said operative condition by a respective starting pulse, control means operatively connected to said multi-vibrator means for setting said multi-vibrator means to the said normal condition thereof a relatively short time prior to each starting pulse, main gate means having two inputs and an output, the output of said multi-vibrator means being operatively connected with one input of said main gate means so that the opening thereof is determined by the respective starting pulse, oscillator means operable to produce oscillations of a frequency of N' kc./s. and operatively connected to the other input of said main gate means, and frequency divider means operable to produce a ratio $k'$ and provided with an input connected to the output of said main gate means and with an output so as to produce in the output thereof relatively short pulses following each other at the recurrence period $$\tau' = \frac{k'}{N'} \text{ milliseconds}$$

from the opening of said main gate means;

a pulse counter having input means operatively connected to the output of said main gate means and including S binary multi-vibrator means, and means in said pulse counter for restoring said pulse counter to zero by the pulse of the order $2^S$ and further means for simultaneously determining by said last-mentioned pulse the return to zero of said frequency divider means and the return of said bistable multi-vibrator means to the normal condition thereof at a time later by $2^S \cdot \tau'$ than that of the preceding starting pulse.

2. In a coding system for radio or telephone links operable with single side-band and with suppressed carrier, and employing a substantially synchronous cyclic switching of the carrier frequency at the transmitting and receiving stations, a coding device comprising:

means for determining the period of coding cycle including bistable multi-vibrator means provided with an input and an output and having a normal inoperative condition and an operating condition, pulse producing means for producing in the output thereof relatively short starting pulses with a period of recurrence $\tau$, first connecting means operatively connecting the output of said pulse producing means to the input of said multi-vibrator means to apply thereto said starting pulses and to change said multi-vibrator means from the said normal condition to the said operative condition by a respective starting pulse, control means operatively connected to said multi-vibrator means for setting said multi-vibrator means to the said normal condition thereof a relatively short time prior to each starting pulse, main gate means having two inputs and an output, the output of said multi-vibrator means being operatively connected with one input of said main gate means so that the opening thereof is determined by the respective starting pulse, oscillator means operable to produce oscillations of a frequency of N' kc./s. and operatively connected to the other input of said main gate means, and frequency divider means operable to produce a ratio $k'$ and provided with an input connected to the output of said main gate means and with an output so as to produce in the output thereof relatively short pulses following each other at the recurrence period $$\tau' = \frac{k'}{N'} \text{ milliseconds}$$

from the opening of said main gate means;

a pulse counter having input means operatively connected to the output of said main gate means and including S binary multi-vibrator means, and means in said pulse counter for restoring said pulse counter to zero by the pulse of the order $2^S$ and further means for simultaneously determining by said last-mentioned pulse the return to zero of said frequency divider means and the return of said bistable multi-vibrator means to the normal condition thereof at a time later by $2^S \cdot \tau'$ than that of the preceding starting pulse, S, $\tau$ and $\tau'$ being so chosen that the said time of return to the normal condition of said bistable multi-vibrator means precedes the next starting pulse by a period at most $\tau'/10$.

3. In a coding system for radio or telephone links operable with single side-band and with suppressed carrier, and employing a substantially synchronous cyclic switching of the carrier frequency at the transmitting and receiving stations, a coding device comprising:

means for determining the period of coding cycle including bistable multi-vibrator means provided with an input and an output and having a normal inoperative condition and an operating condition, pulse producing means for producing in the output thereof relatively short starting pulses with a period of recurrence $\tau$, first connecting means operatively connecting the output of said pulse producing means to the input of said multi-vibrator means to apply thereto said starting pulses and to change said multi-vibrator means from the said normal condition to the said operative condition by a respective starting pulse, control means operatively connected to said multi-vibrator means for setting said multi-vibrator means to the said normal condition thereof a relatively short time prior to each starting pulse, main gate means having two inputs and an output, the output of said multi-vibrator means being operatively connected with one input of said main gate means so that the opening thereof is determined by the respective starting pulse, oscillator means operable to produce oscillations of a frequency of N' kc./s. and operatively connected to the other input of said main gate means, and frequency divider means operable to produce a ratio $k'$ and provided with an input connected to the output of said main gate means and with an output so as to produce in the output thereof relatively short pulses following each other at the recurrence period $$\tau' = \frac{k'}{N'} \text{ milliseconds}$$

from the opening of said main gate means;

a pulse counter having $2^S$ output means and input means operatively connected to the output of said main gate means and including S binary multi-vibrator means, and means in said pulse counter for restoring said pulse counter to zero by the pulse of the order $2^S$ and further means for simultaneously determining by said last-mentioned pulse the return to zero of said frequency divider means and the return of said bistable multi-vibrator means to the normal condition thereof at a time later by $2^S \cdot \tau'$ than that of the preceding starting pulse;

a decoding matrix provided with $2^S$ input means opertively connected to the $2^S$ output means of said pulse counter and with $2^S$ output means and including means in said decoding matrix for passing each of the $2^S$ output means thereof through a singular condition upon appearance of the corresponding order in said pulse counter, means for multiplying the $2^S$ outputs of said decoding matrix including $2^S$ switch means each effectively provided with a plurality of contacts of the same order as the matrix output means and with wiper means, a plurality of gating means each having input and output means, the input means of a gating means being operatively connected to a corresponding wiper means and the gating means effectively opening during the passage through the singular condition of the matrix output means to which they are connected by the respective wiper means, a plurality of oscillators each connected with the output thereof to the input means of a respective gating means, a frequency mixer having input and output means, a fixed frequency oscillator operatively connected to the input means of said frequency mixer, the output means of said gating means being operatively connected in parallel with the input means of said frequency mixer, and means operatively connecting the $2^S$ matrix output means with said switch contacts in such a manner that the time of application of the different coding frequencies is determined by the relative position between the wiper means and the contacts.

4. In a coding system for radio or telephone links operable with single-side band and with suppressed carrier, and employing a substantially synchronous cyclic switching of the carrier frequency at the transmitting and receiving stations, a coding device comprising:

means for determining the period of coding cycle including bistable multi-vibrator means provided with an input and an output and having a normal inoperative condition and an operating condition, pulse producing means for producing in the output thereof relatively short starting pulses with a period of recurrence $\tau$, first connecting means operatively connecting the output of said pulse producing means to the input of said multi-vibrator means to apply thereto said starting pulses and to change said multi-vibrator means from the said normal condition to the said operative condition by a respective starting pulse, control means operatively connected to said multi-vibrator means for setting said multi-vibrator means to the said normal condition thereof a relatively short time prior to each starting pulse, main gate means having two inputs and an output, the output of said multi-vibrator means being operatively connected with one input of said main gate means so that the opening thereof is determined by the respective starting pulse, oscillator means operable to produce oscillations of a frequency of N' kc./s. and operatively connected to the other input of said main gate means, and frequency divider means operable to produce a ratio $k'$ and provided with an input connected to the output of said main gate means and with an output so as to produce in the output thereof relatively short pulses following each other at the recurrence period $$\tau'=\frac{k'}{N'} \text{ milliseconds}$$

from the opening of said main gate means;

a pulse counter having input means operatively connected to the output of said main gate means and including S binary multi-vibrator means, and means in said pulse counter for restoring said pulse counter to zero by the pulse of the order $2^S$ and further means for simultaneously determining by said last-mentioned pulse the return to zero of said frequency divider means and the return of said bistable multi-vibrator means to the normal condition thereof at a time later by $2^S\cdot\tau'$ than that of the preceding starting pulse;

S being equal to 4, and said pulse counter which includes 4 multi-vibrator means, being constructed as decimal counter to enable use of the frequencies of ten different oscillators during ten elementary intervals.

5. In a coding system for radio or telephone links operable with single side-band and with suppressed carrier, and employing a substantially synchronous cyclic switching of the carrier frequency at the transmitting and receiving stations, a coding device comprising:

means for determining the period of coding cycle including bistable multi-vibrator means provided with an input and an output and having a normal inoperative condition and an operating condition, pulse producing means for producing in the output thereof relatively short starting pulses with a period of recurrence $\tau$, first connecting means operatively connecting the output of said pulse producing means to the input of said multi-vibrator means to apply thereto said starting pulses and to change said multi-vibrator means from the said normal condition to the said operative condition by a respective starting pulse, control means operatively connected to said multi-vibrator means for setting said multi-vibrator means to the said normal condition thereof a relatively short time prior to each starting pulse, main gate means having two inputs and an output, the output of said multi-vibrator means being operatively connected with one input of said main gate means so that the opening thereof is determined by the respective starting pulse, oscillator means operable to produce oscillations of a frequency of N' kc./s. and operatively connected to the other input of said main gate means, and frequency divider means operable to produce a ratio $k'$ and provided with an input connected to the output of said main gate means and with an output so as to produce in the output thereof relatively short pulses following each other at the recurrence period $$\tau'=\frac{k'}{N'} \text{ milliseconds}$$

from the opening of said main gate means;

a pulse counter having input means operatively connected to the output of said main gate means and including S binary multi-vibrator means, and means in said pulse counter for restoring said pulse counter to zero by the pulse of the order $2^S$ and further means for simultaneously determining by said last-mentioned pulse the return to zero of said frequency divider means and the return of said bistable multi-vibrator means to the normal condition thereof at a time later by $2^S\cdot\tau'$ than that of the preceding starting pulse;

the total number of oscillators being larger than that of the oscillators used during one coding cycle.

6. In a coding system for radio or telephone links operable with single side-band and with suppressed carrier, and employing a substantially synchronous cyclic switching of the carrier frequency at the transmitting and receiving stations, a coding device for a transmitter station comprising:

means for determining the period of coding cycle including bistable multi-vibrator means provided with an input and an output and having a normal inoperative condition and an operating condition, pulse producing means for producing in the output thereof relatively short starting pulses with a period of recurrence $\tau$ including a local oscillator, first connecting means operatively connecting the output of said pulse producing means to the input of said multi-vibrator means to apply thereto said starting pulses and to change said multi-vibrator means from the said normal condition to the said operative condition by a respective starting pulse, control means operatively connected to said multi-vibrator means for setting said multi-vibrator means to the said normal condition thereof a relatively short time prior to each starting pulse, main gate means having two inputs and an output, the output of said multi-vibrator means being operatively connected with one input of said main gate means so that the opening thereof is determined by the respective starting pulse, oscillator means operable to produce oscillations of a frequency of N' kc./s. and operatively connected to the other input of said main gate means, and frequency divider means operable to produce a ratio $k'$ and provided with an input connected to the output of said main gate means and with an output so as to produce in the output thereof relatively short pulses following each other at the recurrence period $$\tau'=\frac{k'}{N'} \text{ milliseconds}$$

from the opening of said main gate means;

a pulse counter having input means operatively connected to the output of said main gate means and including S binary multi-vibrator means, and means in said pulse counter for restoring said pulse counter to zero by the pulse of the order $2^S$ and further means for simultaneously determining by said last-mentioned pulse the return to zero of said frequency divider means and the return of said bistable multi-vibrator means to the normal condition thereof at a time later by $2^S \cdot \tau'$ than that of the preceding starting pulse, S, $\tau$ and $\tau'$ being so chosen that the said time of return to the normal condition of said bistable multi-vibrator means precedes the next starting pulse by a period at most $\tau'/10$.

7. In a coding system for radio or telephone links operable with single side-band and with suppressed carrier, and employing a substantially synchronous cyclic switching of the carrier frequency at the transmitting and receiving stations, a coding device for a receiver station comprising:

means for determining the period of coding cycle including bistable multi-vibrator means provided with an input and an output and having a normal inoperative condition and an operating condition, pulse producing means for producing in the output thereof relatively short starting pulses with a period of recurrence $\tau$ including receiver means for selecting the starting pulses transmitted by the transmitter station, first connecting means operatively connecting the output of said pulse producing means to the input of said multi-vibrator means to apply thereto said starting pulses and to change said multi-vibrator means from the said normal condition to the said operative condition by a respective starting pulse, control means operatively connected to said multi-vibrator means for setting said multi-vibrator means to the said normal condition thereof a relatively short time prior to each starting pulse, main gate means having two inputs and an output, the output of said multi-vibrator means being operatively connected with one input of said main gate means so that the opening thereof is determined by the respective starting pulse, oscillator means operable to produce oscillations of a frequency of N' kc./s. and operatively connected to the other input of said main gate means, and frequency divider means operable to produce a ratio $k'$ and provided with an input connected to the output of said main gate means and with an output so as to produce in the output thereof relatively short pulses following each other at the recurrence period $$\tau' = \frac{k'}{N'} \text{ milliseconds}$$

from the opening of said main gate means;

a pulse counter having input means operatively connected to the output of said main gate means and including S binary multi-vibrator means, and means in said pulse counter for restoring said pulse counter to zero by the pulse of the order $2^S$ and further means for simultaneously determining by said last-mentioned pulse the return to zero of said frequency divider means and the return of said bistable multi-vibrator means to the normal condition thereof at a time later by $2^S \cdot \tau'$ than that of the preceding starting pulse, S, $\tau$ and $\tau'$ being so chosen that the said time of return to the normal condition of said bistable multi-vibrator means precedes the next starting pulse by a period at most $\tau'/10$.

8. In a coding system for radio or telephone links operable with single side-band and with suppressed carrier, and employing a substantially synchronous cyclic switching of the carrier frequency at the transmitting and receiving stations, a coding device comprising:

means for determining the period of coding cycle including bistable multi-vibrator means provided with an input and an output and having a normal inoperative condition and an operating condition, pulse producing means for producing in the output thereof relatively short starting pulses with a period of recurrence $\tau$, first connecting means operatively connecting the output of said pulse producing means to the input of said multi-vibrator means to apply thereto said starting pulses and to change said multi-vibrator means from the said normal condition to the said operative condition by a respective starting pulse, control means operatively connected to said multi-vibrator means for setting said multi-vibrator means to the said normal condition thereof a relatively short time prior to each starting pulse, main gate means having two inputs and an output, the output of said multi-vibrator means being operatively connected with one input of said main gate means so that the opening thereof is determined by the respective starting pulse, oscillator means operable to produce oscillations of a frequency of N' kc./s. and operatively connected to the other input of said main gate means, and frequency divider means operable to produce a ratio $k'$ and provided with an input connected to the output of said main gate means and with an output so as to produce in the output thereof relatively short pulses following each other at the recurrence period $$\tau' = \frac{k'}{N'} \text{ milliseconds}$$

from the opening of said main gate means;

a pulse counter having $2^S$ output means and input means operatively connected to the output of said main gate means and including S binary multi-vibrator means, and means in said pulse counter for restoring said pulse counter to zero by the pulse of the order $2^S$ and further means for simultaneously determining by said last-mentioned pulse the return to zero of said frequency divider means and the return of said frequency divider means and the return of said bistable multi-vibrator means to the normal condition thereof at a time later by $2^S \cdot \tau'$ than that of the preceding starting pulse, S, $\tau$ and $\tau'$ being so chosen that the said time of return to the normal condition of said bistable multi-vibrator means precedes the next starting pulse by a period at most $\tau'/10$;

a decoding matrix provided with $2^S$ input means operatively connected to the $2^S$ output means of said pulse counter and with $2^S$ output means and including means in said decoding matrix for passing each of the $2^S$ output means thereof through a singular condition upon appearance of the corresponding order in said pulse counter, means for multiplying the $2^S$ outputs of said decoding matrix including $2^S$ switch means each effectively provided with a plurality of contacts of the same order as the matrix output means and with wiper means, a plurality of $2^S$ gating means each having input and output means, the input means of a gating means being operatively connected to a corresponding wiper means and the gating means effectively opening during the passage through the singular condition of the matrix output means to which they are connected by the respective wiper means, a plurality of $2^S$ crystal-controlled oscillators each connected with the output thereof to the input means of a respective gating means, a frequency mixer having input and output means, a fixed frequency oscillator operatively connected to the input means of said frequency mixer, the output means of said gating means being operatively connected in parallel with the input means of said frequency mixer, and means operatively connecting the $2^S$ matrix output means with said switch contacts in such a manner that the time of application of the different coding frequencies is determined by the relative position between the wiper means and the contacts, S being equal to 4, and said pulse counter which includes 4 multi-vibrator means, being constructed as decimal counter to enable use of the frequencies of ten different oscillators during ten elementary intervals, the total number of oscillators being larger than that of the oscillators used during one coding cycle.

9. In a coding system for radio or telephone links operable with single side-band and with suppressed carrier, and employing a substantially synchronous cyclic switching of the carrier frequency at the transmitting and receiving stations, a coding device comprising:

means for determining the period of coding cycle including bistable multi-vibrator means provided with an input and an output and having a normal inoperative condition and an operating condition, pulse producing means for producing in the output thereof relatively short starting pulses with a period of recurrence $\tau$, first connecting means operatively connecting the output of said pulse producing means to the input of said multi-vibrator means to apply thereto said starting pulses and to change said multi-vibrator means from the said normal condition to the said operative condition by a respective starting pulse, control means operatively connected to said multi-vibrator means for setting said multi-vibrator means to the said normal condition thereof a relatively short time prior to each starting pulse, main gate means having two inputs and an output, the output of said multi-vibrator means being operatively connected with one input of said main gate means so that the opening thereof is determined by the respective starting pulse, oscillator means operable to produce oscillations of a frequency of N′ kc./s. and operatively connected to the other input of said main gate means, and frequency divider means operable to produce a ratio $k'$ and provided with an input connected to the output of said main gate means and with an output so as to produce in the output thereof relatively short pulses following each other at the recurrence period $$\tau' = \frac{k'}{N'} \text{ milliseconds}$$

from the opening of said main gate means;

a pulse counter having $2^S$ output means and input means operatively connected to the output of said main gate means and including S binary multi-vibrator means, and means in said pulse counter for restoring said pulse counter to zero by the pulse of the order $2^S$ and further means for simultaneously determining by said last-mentioned pulse the return to zero of said frequency divider means and the return of said bistable multi-vibrator means to the normal condition thereof at a time later by $2^S \cdot \tau'$ than that of the preceding starting pulse;

a decoding matrix provided with $2^S$ input means operatively connected to the $2^S$ output means of said pulse counter and with said $2^S$ output means and including means in said decoding matrix for passing each of the $2^S$ output means thereof through a singular condition upon appearance of the corresponding order in said pulse counter, means for multiplying the $2^S$ outputs of said decoding matrix including $2^S$ switch means each effectively provided with a plurality of contacts of the same order as the matrix output means and with wiper means, a plurality of gating means each having input and output means, the input means of a gating means being operatively connected to a corresponding wiper means and the gating means effectively opening during the passage through the singular condition of the matrix output means to which they are connected by the respective wiper means, a plurality of oscillators each connected with the output thereof to the input means of a respective gating means, a frequency mixer having input and output means, a fixed frequency oscillator operatively connected to the input means of said frequency mixer, the output means of said gating means being operatively connected in parallel with the input means of said frequency mixer, and means operatively connecting the $2^S$ matrix output means with said switch contacts in such a manner that the time of application of the different coding frequencies is determined by the relative position between the wiper means and the contacts, the total number of oscillators being larger than that of the oscillators used during one coding cycle.

10. In a coding system for radio or telephone links operable with single side-band and with suppressed carrier, and employing a substantially synchronous cyclic switching of the carrier frequency at the transmitting and receiving stations, a coding device comprising:

means for determining the period of coding cycle including bistable multi-vibrator means provided with an input and an output and having a normal inoperative condition and an operating condition, pulse producing means for producing in the output thereof relatively short starting pulses with a period of recurrence $\tau$, first connecting means operatively connecting the output of said pulse producing means to the input of said multi-vibrator means to apply thereto said starting pulses and to change said multi-vibrator means from the said normal condition to the said operative condition by a respective starting pulse, control means operatively connected to said multi-vibrator means for setting said multi-vibrator means to the said normal condition thereof a relatively short time prior to each staring pulse, main gate means having two inputs and an output, the output of said multi-vibrator means being operatively connected with one input of said main gate means so that the opening thereof is determined by the respective starting pulse, oscillator means operable to produce oscillations of a frequency of N′ kc./s. and operatively connected to the other input of said main gate means, and frequency divider means operable to produce a ratio $k'$ and provided with an input connected to the output of said main gate means and with an output so as to produce in the output thereof relatively short pulses following each other at the recurrence period $$\tau' = \frac{k'}{N'} \text{ milliseconds}$$

from the opening of said main gate means;

a pulse counter having $2^S$ output means and input means operatively connected to the output of said main gate means and including S binary multi-vibrator means, and means in said pulse counter for restoring said pulse counter to zero by the pulse of the order $2^S$ and further means for simultaneously determining by said last-mentioned pulse the return to zero of said frequency divider means and the return of said bistable multivibrator means to the normal condition thereof at a time later by $2^S \cdot \tau'$ than that of the preceding starting pulse;

a decoding matrix provided with $2^S$ input means operatively connected to the $2^S$ output means of said pulse counter and with $2^S$ output means and including means in said decoding matrix for passing each of the $2^S$ output means thereof through a singular condition upon appearance of the corresponding order in said pulse counter, means for multiplying the $2^S$ outputs of said decoding matrix including $2^S$ switch means each effectively provided with a plurality of contacts of the same order as the matrix output means and with wiper means, a plurality of gating means each having input and output means, the input means of a gating means being operatively connected to a corresponding wiper means and the gating means effectively opening during the passage through the singular condition of the matrix output means to which they are connected by the respective wiper means, a plurality of oscillators each connected with the output thereof to the input means of a respective gating means, a frequency mixer having input and output means, a fixed frequency oscillator operatively connected to the input means of said frequency mixer, the output means of said gating means being operatively connected in parallel with the input means of said frequency mixer, and means operatively connecting the $2^S$ matrix output means with said switch contacts in such a manner that the time of application of the different coding frequencies is determined by the relative position between the wiper means and the contacts;

S being equal to 4, and said pulse counter which includes 4 multi-vibrator means, being constructed as decimal counter to enable use of the frequencies of ten different oscillators during ten elementary intervals.

References Cited in the file of this patent

UNITED STATES PATENTS

| | | |
|---|---|---|
| 2,845,613 | Pawley | July 29, 1958 |
| 2,871,290 | Earp | Jan. 27, 1959 |